United States Patent [19]

Kuoyama

[11] Patent Number: 4,776,104

[45] Date of Patent: Oct. 11, 1988

[54] BALANCED EXTRACTION SYSTEM

[76] Inventor: Nobuyoshi Kuoyama, 96 Litchfield Dr., Carlisle, Mass. 01741

[21] Appl. No.: 42,725

[22] Filed: Apr. 27, 1987

[51] Int. Cl.[4] ............ F26B 21/02

[52] U.S. Cl. ............ 34/77; 34/92; 34/78

[58] Field of Search ............ 34/77, 78, 92, 73

[56] References Cited

U.S. PATENT DOCUMENTS 4,292,744 10/1981 Nabholz ............ 34/78

*Primary Examiner*—Larry I. Schwartz

*Attorney, Agent, or Firm*—Thomas R. Morrison

[57] ABSTRACT

A balanced extraction system including a decompressed space and a pressurized space connected to form a decompression/pressurization balanced circuit. Atomized corpuscles are generated from a liquid such as water in the pressurized space. The atomized corpuscles are held at an appropriate vapor pressure and temperature and fed to the surface of a matter to be extracted, in the decompressed space. Foodstuffs fragrance and other matter to be extracted are coated with dew-like droplets which are the vaporized and extracted and then condensed within the circuit to recover the matter to be extracted.

13 Claims, 2 Drawing Sheets

BALANCED EXTRACTION SYSTEM

BACKGROUND OF THE INVENTION

1. Field of the Invention

The present invention relates to a balanced extraction system wherein various available components are extracted. Extracted matter can also be dried.

2. Description of the Prior Art

A prior art extraction system of this kind comprises soaking matter to be extracted in liquid and, combining an auxiliary means such as pressurization suction and the like with a filtration means for extraction.

However, such process to soak the matter to be extracted in the liquid as described may involve a hard action for constant filtration. Uniform filtration is not ensured unless a particular construction for prevention of gradual clogging is added. Thus, making optimum extraction unobtainable.

Still further, the matter to be extracted swells more than necessary by impregnation with the liquid, life conditions of the matter to be extracted will thus be destroyed, and since nourishment, to say nothing of smell changes and discoloration and thus leave the the matter to be extracted unavoidably impregnated with liquid. Another means for dehydration includes centrifugal dewatering. In this case heating is needed for keeping the matter to be extracted dry.

In view of the prior art described above, the inventor has actually proposed a novel art in Japanese Patent Laid-Open No. 35463/1986, which comprises drying and hydroextracting a hydrous material or hydrous matter in a reduced air pressure.

BRIEF SUMMARY OF THE INVENTION

The present invention is a device wherein matter to be extracted which contains various available components is kept in a state almost like a natural environment or, for example, enclosed within a decompressed space where the natural environment will not destroy living and life keeping environment of the living thing, water or other liquid stored within a pressurized space coupled to the decompressed space is fed to the decompressed space as activated by a vaporized corpuscle having a necessary temperature and pressure and thus deposited like dew drops on the surface of the matter to be extracted which is enclosed within the decompressed space, a leaching effect of available components within the matter to be extracted according to reducing air pressure is accelerated, the dewed liquid on the surface of the matter to be extracted are extracted within the passing vaporized corpuscle and vaporized to derivation along a circuit connecting both the spaces, pressurization and decompression are kept balancing with each other as a whole, and the extracted vapor is condensed through a cooling part provided on the circuit to obtain an extracted liquid.

The invention is further characterized by an arrangement wherein a connection with the pressurized space is cut-off after extraction of available components of the matter to be extracted or as containing available components of the matter to be extracted, and thus the matter to be extracted can effectively be dried on decompression only in the decompressed space.

Further, in the invention, a heating means controllable for heating a gaseous corpuscle atomized and coming from the pressurized space is provided on a passage coupling the pressurized space and the decompressed space, a temperature difference can thus be given with the matter to be extracted which is enclosed within the pressurized space, and the dewing effect of the gaseous corpuscle on the surface of the matter to be extracted can be enhanced thereby to activation.

Then, a light source such as infrared radiation, ultraviolet radiation or the like, or a necessary means or device such as, for example, ion generation mechanism the like which is capable of improving a living environment in the decompressed space can be incorporated in the decompressed space together with or without the aforementioned heating means.

DESCRIPTION OF THE PREFERRED EMBODIMENTS

Preferred embodiments of the invention will now be described with reference to the accompanying drawings.

Figure 1:
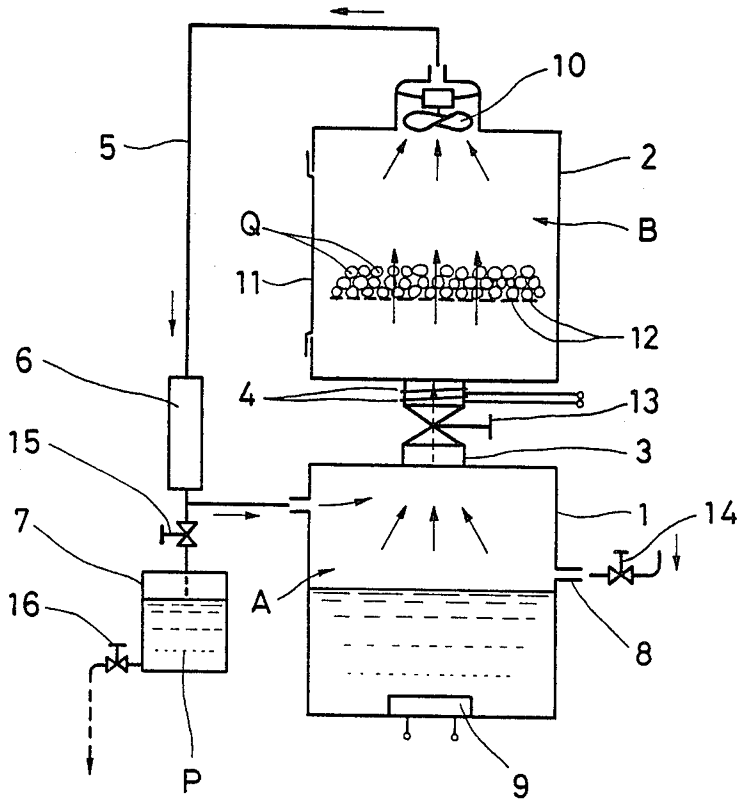
FIG. 1 is a diagram in section representing a major portion of one embodiment given in the most basic construction of a balanced extraction system relating to the invention.

First, the embodiment shown in FIG. 1 represents a basic construction of the invention, wherein 1 denotes a pressurized chamber corresponding to a pressurized space A, 2 denotes a decompressed chamber corresponding to a decompressed space B, 3 denotes a passage connecting both the chambers 1, 2, and a heating means 4 is provided additionally thereto as occasion arises. A reference numeral 5 indicates a circuit running toward the pressurized chamber 1 from the decompressed chamber 2, a cooling part 6 is midway between pressurized chamber 1 and decompressed chamber 2 to cool down and condense a gas passing through the circuit 5, which is stored as an extract P in a receptacle 7 on a bypass of the circuit 5. Then, the gas left uncondensed through the cooling part 6 is returned into the pressurized chamber 1 and subjected to a recirculation. Accordingly, the pressurized chamber 1 and the decompressed chamber 2 form one circuit of the passage 3 and the circuit 5.

On the other hand, the pressurized chamber 1 constructs a sealed chamber having a structure capable of storing therein a liquid of various chemical components including a pure water like distilled water, which is ready for feeding liquid externally through an injection part 8. Further, an ultrasonic wave oscillating vibrator 9, for example, is disposed within the pressurized chamber 1, water content or liquid content is atomized to a vaporized corpuscle by giving an ultrasonic vibration to the liquid stored therein, thereby raising a vapor pressure in the pressurized chamber 1.

Then, the decompressed chamber 2 presents a leakproof structure as in the case of pressurized chamber 1, a rotary means 10 available to reducing air pressure at a balanced level equivalently to the rotary means developed previously and so proposed by the inventor which is disclosed, for example, in U.S. Pat. No. 4,319,408, U.S. Pat. No. 4,426,793, U.S. Pat. No. 4,457,083 and so on is disposed for exhausting action as a decompression means therefor, a necessary matter to be extracted Q such as, for example, plant, animal, mineral or the like can be handled through a door 11 of the sealed chamber, and the matter to be extracted Q can further be enclosed in single or multiple layer on a single- or multiple-stage porous stand such as net, crosspiece or the like.

Accordingly, the decompressed chamber 2 has an exhausting action accelerated by rotation of the rotary means 10 interiorly, thus producing a decompressed state.

Then, while not particularly illustrated, a heating source such as infrared radiation or the like, a light source such as ultraviolet radiation or the like, or a necessary equipment such as ion generator or the like can be installed within the decompressed chamber 2, and further a rotary or vertical motion can also be permitted to the matter to be extracted Q on the porous stand 12. The stand 12 in this case is free in structure and hence is not necessarily porous.

Next, a communication pipe structure is basically acceptable for the passage 3 connecting the pressurized chamber 1 and the decompressed chamber 2, however, it is preferable that the heating means 4 such as electric heater or the like be provided, as occasion demands, a thermal energy is thus given to the gaseous corpuscle passing therethrough to keep it somewhat higher than temperature of the matter to be extracted Q in the decompressed chamber 2, thereby allowing dewing effectively on the surface of the matter to be extracted Q.

However, the heat source 4 is not necessarily provided, and the heat source 4 itself may only be used when required by abient temperature, or the kind and volume of the matter to be extracted Q.

Further, a valve 13 for regulating a flow rate is provided on the passage 3, which is ready for operating manually or automatically through full travel at the time of drying or controlling the flow rate.

The circuit 5 is provided with a pipe structure connecting the decompressed chamber 2 to the pressurized chamber 1, the cooling part 6 is provided halfway thereof, and a liquid condensed at the cooling part 6 is fed to the receptacle 7, as described hereinbefore, thus bypassing of the circuit 5. Then, the cooling part 6 may operate on a forced cooling by refrigerant or on a natural radiation using coils, thus the structure is not particularly specified.

Meanwhile, reference numerals 14, 15, 16 in the drawing denote valves provided on necessary portions.

A function will be described with reference to the aforementioned construction.

First, a quantity of a liquid such as pure water, distilled water or the like is fed into the pressurized chamber 1 through the injection part 8. Then, matter to be extracted such as herb, vegetable, seaweed, corn, meat, fish, shellfish and the like is enclosed for extraction in the decompressed chamber 2.

Under such condition, the rotary means 10 is rotated and the ultrasonic wave oscillating vibrator 9 is operated, thereby balancing air pressures in the decompressed chamber 2 and the pressurized chamber 1.

That is, the vibrator 9 atomize the liquid into a vaporized corpuscles filling the pressurized chamber 1, a desired vapor pressure is generated thereby, thus obtaining a pressurized vaporized corpuscle.

The vaporized corpuscles pass through the passage 3 and flow into the decompressed chamber 2. They may be warmed by the heating means 4 of the passage 3 and get active in molecular motion to flow into the decompressed chamber 2.

Meanwhile, the decompressed chamber 2 presents a mode of decompressed state through an exhaust action given by rotations of the rotary means 10, however, a magnitude of the decompressed state can arbitrarily be changed by adjusting the rotary means 10 for action, and the plant or animal which is a matter to be extracted can be kept alive at all times without harming the tissue cells for respiration to extinction.

Accordingly, the vaporized corpuscles having flowed into the decompressed chamber 2 sticks as droplets of dew mostly on the surface of the matter to be extracted. Part of the corpuscles pass the surface and go direct toward the circuit 5 in some cases.

Meanwhile, since the matter to be extracted Q in the decompressed chamber 2 is subjected to a decompression as a whole, an extract component such as nourishment, smell or the like is ready to leak to the surface of the matter to be extracted Q and thus is dissolved immediately in dew droplets of liquid on the surface. the liquid content is again subjected to vaporization with the extract component retained therein and introduced into the circuit 5, passes through circuit 5 and then reaches cooling part 6 to be subjected to rapid cooling. Accordingly, the vaporized content is condensed and liquefied, and flows into the receptacle 7 through the bypass, thus obtaining the extract P.

Then, the vaporized content left uncondensed at the cooling part 6 returns into the pressurized chamber 1 to become vaporized corpuscle again and is subjected to the similar operation repeatedly.

When the extract component is extracted almost perfectly through the extracting operation carried out continuously to the matter to be extracted Q, the pressurized chamber 1 stops operating, and valve 13 is closed, as occasion demands, to an operation only in the decompressed chamber 2, thus the dew content on the surface of the matter to be extracted Q and the internal water content are dehydrated effectively on an action for reducing air pressure at a balanced level, thereby drying the matter to be extracted Q thoroughly. Then, the moisture thus extracted is vaporized to a gas, driven into circuit 5, condensed at the cooling part 6 to a liquid and then stored in the pressurized chamber 1 or the receptacle 7.

Needless to say, the valve 15 on the bypass is closed in this case or the extract P is drawn out beforehand by opening the valve 16.

The extraction or drying system according to the circuit configuration is effected as balancing pressurization and decompression, therefore the operation will be kept from danger which could result from abnormal pressure rise and hence is completely safe.

Needless to say, motor control and rotation control of the rotary means 10, or pressure regulation of the pressurized chamber 1 and the decompressed chamber 2, or cooling control of the cooling part 6, or further heat regulation of the heating means 4 may be effected electrically by a proper controller (not shown).

Another embodiment given in FIG. 2 will be then described next to the embodiment of FIG. 1.

The embodiment is different only in the respect that a suction pump **10*a* is employed for the decompression means of the decompressed chamber 2 and hence is identical with the embodiment given in FIG. 1** in other construction, therefore no further description will be given thereof.

The decompressed chamber 2 can be held at a necessary degree of decompression by means of the suction pump 10a provided on the side of circuit 5, however, since a balanced heating action will not be presented thereby unlike the rotary means 10 of FIG. 1, there may be a case where a heater is incorporated in the decompressed chamber 2 as occasion demands.

Figure 2:
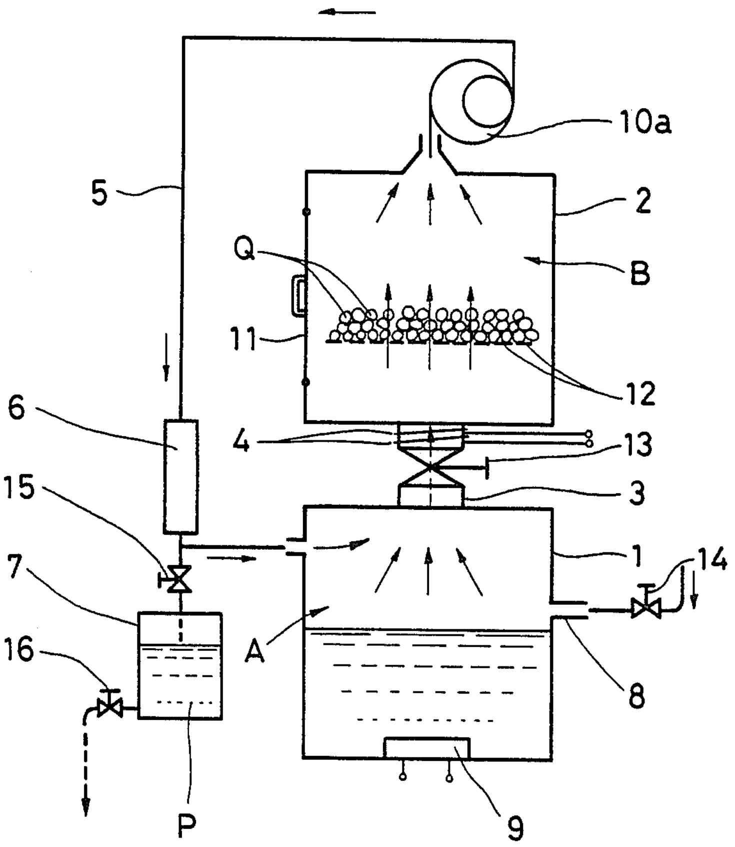
FIG. 2 is a diagram in section representing a major portion of another embodiment of the invention.

Be that as it may, the embodiment of FIG. 2 is not particularly different from that of FIG. 1 in effect of the function, therefore a description will be omitted thereof.

Then, in the aforementioned embodiment, the means for atomizing the liquid to corpuscle in the pressurized chamber 1 can be substituted by a proper means other than ultrasonic wave vibration, or, for example, centrifugal atomization or other means.

In addition to the position shown in the respective FIGS. 1 and 2, the rotary means 10 in FIG. 1 and the suction pump 10a in FIG. 2 can also be provided at desired position on the circuit 5, and further, can be provided, passing through the cooling part 6, with the pressurized chamber 1 side.

What is claimed is:

1. An extraction system comprising:

a pressurized space;

a decompressed space;

connecting means for connecting said pressurized space and said decompressed space into a circuit;

means in said connecting means for reducing a pressure in said decompressed space and increasing a pressure in said pressurized space to balanced pressures;

means in said pressurized space for producing vaporized corpuscles;

means in said decompressed space for containing a matter to be extracted;

means for feeding said vaporized corpuscles from said pressurized space to said decompressed space;

means for controlling at least a first temperature of said vaporized corpuscles entering said decompressed space with respect to a second temperature of said matter to be extracted such that said vaporized corpuscles tend to condense, as dew, upon a surface of said matter to be extracted, whereby matter in said matter to be extracted that is soluble in the condensed vaporized corpuscles is sorbed therein;

said pressure in said decompressed space having a value permitting at least part of said matter to be extracted, and sorbed in said condensed vapor, to vaporize and pass into said means for connecting; and means for recovering said matter to be extracted from said means for connecting, whereby said matter to be extracted is collected.

2. A balanced extraction system according to claim 1 wherein:

said connecting means includes a valve for regulating a flow rate.

3. A balanced extraction system according to claim 2 wherein:

said valve is effective to seal said decompressed space, keeping said matter to be extracted in a decompressed state.

4. A balanced extraction system according to claim 1 wherein:

said means in said connecting means includes a rotary means.

5. A balanced extraction system according to claim 1 wherein:

said means in said connecting means includes a suction pump.

6. A balanced extraction system according to claim 1 wherein:

said means in said pressurized space for producing vaporized corpuscles is an ultrasonic vibrator effective to atomize a liquid stored therein.

7. A balanced extraction system according to claim 1 wherein:

said means for controlling at least a first temperature includes a heating means.

8. A balanced extraction system according to claim 1 wherein:

said means for recovering said matter to be extracted includes a cooling means.

9. A balanced extraction system according to claim 1 wherein:

a means for bypassing said circuit is included.

10. A balanced extraction system according to claim 9 wherein:

said means for bypassing said circuit includes a receptacle for an extract.

11. A balanced extraction system according to claim 1 wherein:

a means for preventing said pressurized space from operating whereby only said decompressed space is operated, thereby drying said matter to be extracted thoroughly.

12. A balanced extraction system according to claim 1, further comprising means in said decompressed space for improving a living environment therein.

13. A balanced extraction system according to claim 12, wherein said means for improving a living environment includes at least one of an infrared source, an ultraviolet source, and an ion generation mechanism.

* * * * *

UNITED STATES PATENT AND TRADEMARK OFFICE

CERTIFICATE OF CORRECTION

PATENT NO. : 4,776,104

DATED : October 11, 1988

INVENTOR(S) : Nobuyoshi Kuboyama

It is certified that error appears in the above-identified patent and that said Letters Patent is hereby corrected as shown below:

Title page:

Item [76] Inventor: "Nobuyoshi Kuoyama" should read --Nobuyoshi Kuboyama--.

Signed and Sealed this

Fourth Day of April, 1989

*Attest:*

DONALD J. QUIGG

*Attesting Officer*

*Commissioner of Patents and Trademarks*

Disclaimer and Dedication

4,776,104—Nobuyoshi Kuboyama, Carlisle, Mass., BALANCED EXTRACTION SYSTEM. Patent dated Oct. 11, 1988. Disclaimer and dedication filed Oct. 8, by the inventor.

Hereby disclaims and dedicates to the public all claims of said patent.

*(Official Gazette, June 24, 2003)*